US010005639B2

(12) United States Patent
Wang et al.

(10) Patent No.: US 10,005,639 B2
(45) Date of Patent: Jun. 26, 2018

(54) SENSORS FOR CONVEYANCE CONTROL

(71) Applicant: Otis Elevator Company, Farmington, CT (US)

(72) Inventors: Hongcheng Wang, Farmington, CT (US); Arthur Hsu, South Glastonbury, CT (US); Alan Matthew Finn, Hebron, CT (US); Hui Fang, Shanghai (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 156 days.

(21) Appl. No.: 14/911,934

(22) PCT Filed: Aug. 15, 2013

(86) PCT No.: PCT/US2013/055054

§ 371 (c)(1),
(2) Date: Feb. 12, 2016

(87) PCT Pub. No.: WO2015/023278

PCT Pub. Date: Feb. 19, 2015

(65) Prior Publication Data

US 2016/0194181 A1 Jul. 7, 2016

(51) Int. Cl.
*H04N 9/47* (2006.01)
*B66B 1/46* (2006.01)

(52) U.S. Cl.
CPC ...... *B66B 1/468* (2013.01); *B66B 2201/4615* (2013.01); *B66B 2201/4623* (2013.01); *B66B 2201/4638* (2013.01)

(58) Field of Classification Search
CPC ............ B66B 1/468; B66B 2201/4615; B66B 2201/4623; B66B 2201/4638
USPC ................ 348/77, 61, 34, 78; 386/200, 224
See application file for complete search history.

(56) References Cited

U.S. PATENT DOCUMENTS

| | | | |
|---|---|---|---|
| 5,291,020 | A | 3/1994 | Lee |
| 5,298,697 | A | 3/1994 | Suzuki et al. |
| 5,387,768 | A | 2/1995 | Izard et al. |
| 5,518,086 | A | 5/1996 | Tyni |
| 5,581,625 | A | 12/1996 | Connell |
| 7,079,669 | B2 | 7/2006 | Hashimoto et al. |
| 7,140,469 | B2 | 11/2006 | Deplazes et al. |
| 7,165,655 | B2 | 1/2007 | Cook et al. |
| 7,397,929 | B2 | 7/2008 | Nichani et al. |
| 7,400,744 | B2 | 7/2008 | Nichani et al. |

(Continued)

FOREIGN PATENT DOCUMENTS

| | | |
|---|---|---|
| CN | 1512956 A | 7/2004 |
| CN | 1625524 A | 6/2005 |

(Continued)

OTHER PUBLICATIONS

Andersen, M. R., et al., "Kinect Depth Sensor Evaluation for Computer Vision Applications" Aarhus University, 2012, 39pgs.

(Continued)

*Primary Examiner* — Robert Chevalier
(74) *Attorney, Agent, or Firm* — Cantor Colburn LLP

(57) ABSTRACT

A method includes generating a depth stream from a scene associated with a conveyance device; processing, by a computing device, the depth stream to obtain depth information; recognizing a gesture based on the depth information; and controlling the conveyance device based on the gesture.

20 Claims, 4 Drawing Sheets

(56) References Cited

U.S. PATENT DOCUMENTS

| | | | |
|---|---|---|---|
| 7,823,703 B2 | 11/2010 | Amano | |
| 8,020,672 B2 | 9/2011 | Lin et al. | |
| 8,260,042 B2 | 9/2012 | Peng et al. | |
| 2004/0134718 A1 | 7/2004 | Matsuda et al. | |
| 2005/0173200 A1 | 8/2005 | Cook et al. | |
| 2008/0256494 A1 | 10/2008 | Greenfield | |
| 2009/0208067 A1 | 8/2009 | Peng et al. | |
| 2010/0091110 A1 | 4/2010 | Hildreth | |
| 2011/0080490 A1 | 4/2011 | Clarkson et al. | |
| 2011/0202178 A1 | 8/2011 | Zhen et al. | |
| 2012/0218406 A1 | 8/2012 | Hanina et al. | |
| 2012/0234613 A1 | 9/2012 | Hsieh | |
| 2012/0234631 A1 | 9/2012 | Hsieh | |
| 2013/0075201 A1 | 3/2013 | Lee et al. | |
| 2015/0043770 A1 * | 2/2015 | Chen .................. | G06K 9/00208 382/103 |

FOREIGN PATENT DOCUMENTS

| | | | |
|---|---|---|---|
| CN | 101506077 | A | 8/2009 |
| EP | 0936576 | A2 | 8/1999 |
| EP | 1074958 | A1 | 2/2001 |
| EP | 2196425 | A1 | 6/2010 |
| GB | 2479495 | A | 10/2011 |
| WO | 2012143612 | A1 | 10/2012 |
| WO | 2013063767 | A1 | 5/2013 |

OTHER PUBLICATIONS

Castaneda, Victor“Time-of-Flight and Kinect Imaging” Kinect Programming for Computer Vision Summer Term 2011, Jun. 1, 2011, 53pgs.

Condliffe, Jamie“Could This Gesture Control Be Even Better Than Leap Motion?”, Mar. 12, 2013, 4 pages.

International Search Report and Written Opinion for application PCT/US2013/055054, dated Apr. 21, 2014, 12 pages.

Paradiso, Joe et al., “MIT Media Lab Responsive Environments Digito: A Fine-Grained, Gesturally Controlled Virtual Musical Instrument”, downloaded May 8, 2013, 5 pages.

Texiera, Thiago et al. “A Survey of Human-Sensing: Methods for Detecting Presence, Count, Location, Track, and Identity”, ENALAB Technical Report Sep. 2010, vol. 1, No. 1 , Sep. 2010, 41 pages.

Chinese First Office Action and Search Report for application CN 201380078885.0, dated Feb. 6, 2017, 6pgs.

European Search Report for application EP 13891459.3, dated Mar. 13, 2017, 10pgs.

* cited by examiner

SENSORS FOR CONVEYANCE CONTROL

BACKGROUND

Existing conveyance devices, such as elevators, are equipped with sensors for detection of people or passengers. The sensors, however, are unable to capture many passenger behaviors. For example, a passenger that slowly approaches an elevator may have the elevator doors close prematurely unless a second passenger holds the elevator doors open. Conversely, the elevator doors may be held open longer than is necessary, such as when all the passengers quickly enter the elevator car and no additional passengers are in proximity to the elevator.

Two-dimensional (2D) and three-dimensional (3D) sensors may be used in an effort to capture passenger behaviors. Both types of sensors are intrinsically flawed. For example, 2D sensors that operate on the basis of color or intensity information may be unable to distinguish two passengers wearing similar colored clothing or may be unable to discriminate between a passenger and an object in the background of similar color. 3D sensors that provide depth information may be unable to generate an estimate of depth in a so-called "shadow region" due to a difference in distance between an emitter/illuminator (e.g., an infrared (IR) laser diode) and a receiver/sensor (e.g., an IR sensitive camera). What is needed is a device and method of sufficient resolution and accuracy to allow explicit and implicit gesture-based control of a conveyance. An explicit gesture is one intentionally made by a passenger intended for communication to the conveyance controller. An implicit gesture is where the presence or behavior of the passenger is deduced by the conveyance controller without explicit action on the passenger's part. This need may be economically, accurately, and conveniently realized by a particular gesture recognition system utilizing distance (called hereafter the "depth").

BRIEF SUMMARY

An exemplary embodiment is a method including generating a depth stream from a scene associated with a conveyance device; processing, by a computing device, the depth stream to obtain depth information; recognizing a gesture based on the depth information; and controlling the conveyance device based on the gesture.

Another exemplary embodiment is an apparatus including at least one processor; and memory having instructions stored thereon that, when executed by the at least one processor, cause the apparatus to: generate a depth stream from a scene associated with a conveyance device; process, by a computing device, the depth stream to obtain depth information; recognize a gesture based on the depth information; and control the conveyance device based on the gesture.

Another exemplary embodiment is a system including an emitter configured to emit a pattern of infrared (IR) light onto a scene comprising a plurality of objects; a receiver configured to generate a depth stream in response to the emitted pattern; and a processing device configured to: process the depth stream to obtain depth information, recognize a gesture made by at least one of the objects based on the depth information, and control a conveyance device based on the gesture.

Additional embodiments are described below.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
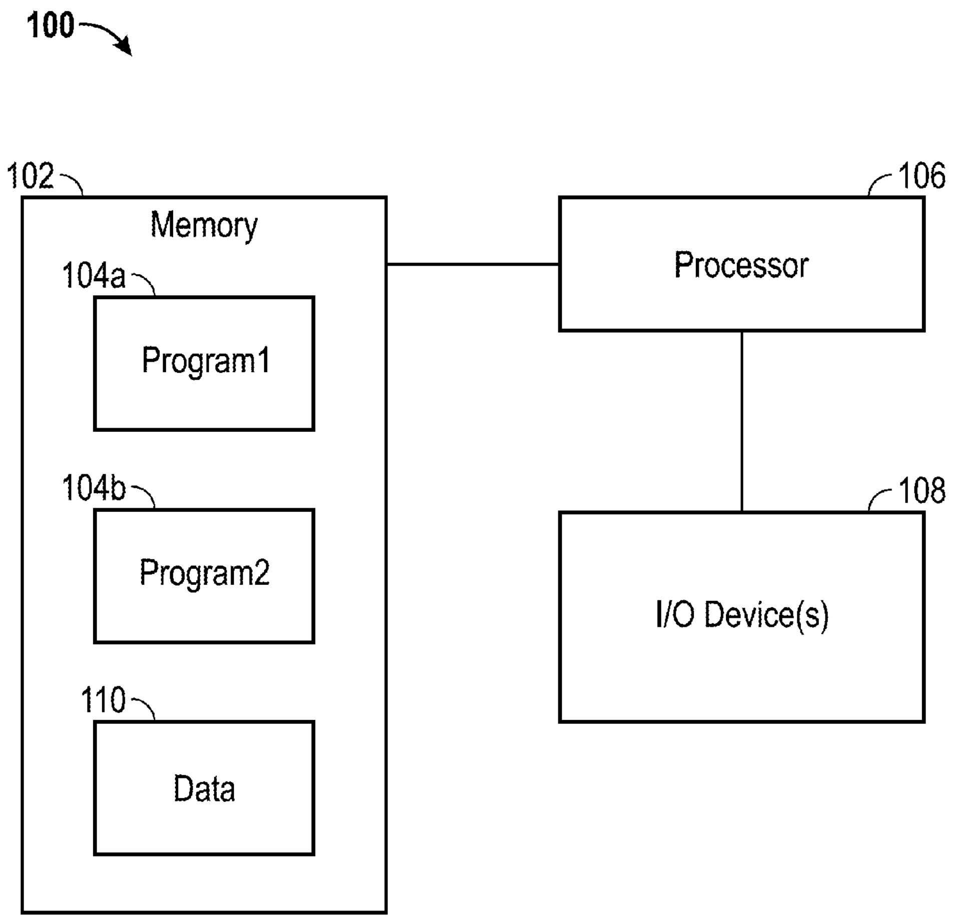
FIG. 1 is a schematic block diagram illustrating an exemplary computing system.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this respect, a coupling between entities may refer to either a direct or an indirect connection.

Exemplary embodiments of apparatuses, systems, and methods are described for providing management capabilities as a service. The service may be supported by a web browser and may be hosted on servers/cloud technology remotely located from a deployment or installation site. A user (e.g., a customer) may be provided an ability to select which features to deploy. The user may be provided an ability to add or remove units from a portfolio of, e.g., a buildings or campuses from a single computing device. New features may be delivered simultaneously across a wide portfolio base.

Referring to FIG. 1, an exemplary computing system 100 is shown. The system 100 is shown as including a memory 102. The memory 102 may store executable instructions. The executable instructions may be stored or organized in any manner and at any level of abstraction, such as in connection with one or more applications, processes, routines, procedures, methods, functions, etc. As an example, at least a portion of the instructions are shown in FIG. 1 as being associated with a first program 104*a* and a second program 104*b*.

The instructions stored in the memory 102 may be executed by one or more processors, such as a processor 106. The processor 106 may be coupled to one or more input/output (I/O) devices 108. In some embodiments, the I/O device(s) 108 may include one or more of a keyboard or keypad, a touchscreen or touch panel, a display screen, a microphone, a speaker, a mouse, a button, a remote control, a joystick, a printer, a telephone or mobile device (e.g., a smartphone), a sensor, etc. The I/O device(s) 108 may be configured to provide an interface to allow a user to interact with the system 100.

The memory 102 may store data 110. The data 110 may include data provided by one or more sensors, such as a 2D or 3D sensor. The data may be processed by the processor 106 to obtain depth information for intelligent crowd sensing for elevator control. The data may be associated with a depth stream that may be combined (e.g., fused) with a video stream for purposes of combining depth and color information.

The system 100 is illustrative. In some embodiments, one or more of the entities may be optional. In some embodiments, additional entities not shown may be included. For example, in some embodiments the system 100 may be associated with one or more networks. In some embodiments, the entities may be arranged or organized in a manner different from what is shown in FIG. 1.

Figure 2:
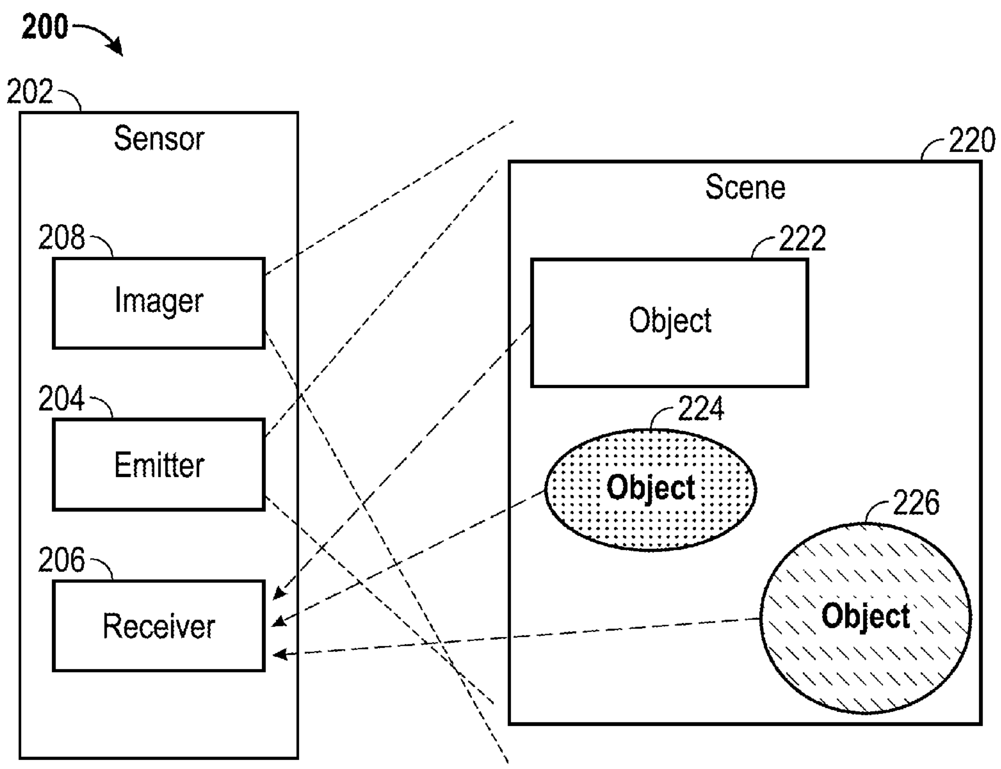
FIG. 2 illustrates an exemplary block diagram of a system for emitting and receiving a pattern.

Turning now to FIG. 2, a block diagram of an exemplary system 200 in accordance with one or more embodiments is shown. The system 200 may include one or more sensors, such as a sensor 202. The sensor 202 may be used to provide a structured-light based device for purposes of obtaining depth information.

The sensor 202 may include an emitter 204 and a receiver 206. The emitter 204 may be configured to project a pattern of electromagnetic radiation, e.g., an array of dots, lines, shapes, etc., in a non-visible frequency range, e.g., ultraviolet (UV), near infrared, far infrared, etc. The sensor 202 may be configured to detect the pattern using a receiver 206. The receiver 206 may include a complementary metal-oxide-semiconductor (CMOS) image sensor or other electromagnetic radiation sensor with a corresponding filter.

The pattern may be projected onto a scene 220 that may include one or more objects, such as objects 222-226. The objects 222-226 may be of various sizes or dimensions, of various colors, reflectances, light intensities, etc. A position of one or more of the objects 222-226 may change over time. The pattern received by the receiver 206 may change size and position based on the relative position of the objects 222-226 relative to the emitter 204. The pattern may be unique per position in order to allow the receiver 206 to recognize each point in the pattern to produce a depth stream containing depth information. A pseudo random pattern may be used in some embodiments. In other exemplary embodiments, the depth information is obtained using a time-of-flight camera, a stereo camera, laser scanning, light detection and ranging (LIDAR), or phased array radar.

Sensor 202 may also include an imager 208 to generate at least one video stream of the scene 202. The video stream may be obtained from a visible color, grayscale, UV, or IR camera. Multiple sensors may be used to cover a large area, such as a hallway or a whole building. It is understood that the imager 208 need not be co-located with the emitter 204 and receiver 206. For example, imager 208 may correspond to a camera focused on the scene, such as a security camera.

In exemplary embodiments, the depth stream and the video stream may be fused. Fusing the depth stream and the video stream involves registering or aligning the two streams, and then processing the fused stream jointly. Alternatively, the depth stream and the video stream may be processed independently, and the results of the processing combined at a decision or application level.

Figure 3:
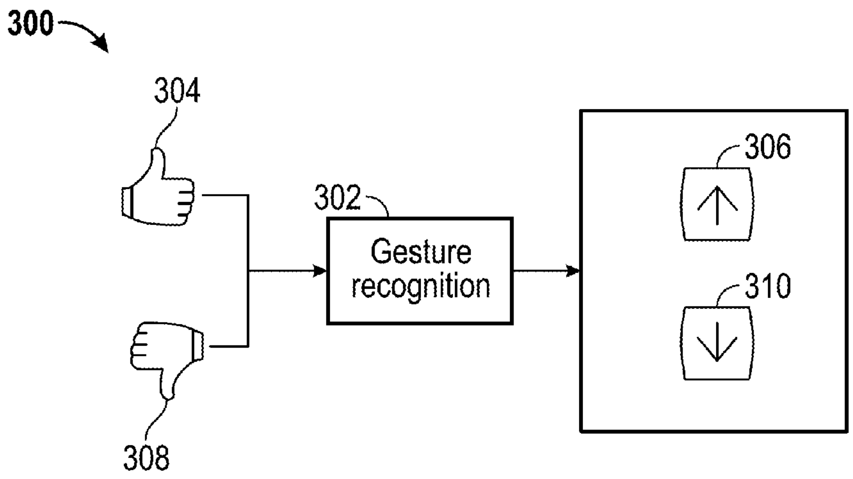
FIG. 3 illustrates an exemplary control environment.

Turning now to FIG. 3, an environment 300 is shown. The environment 300 may be associated with one or more of the systems, components, or devices described herein, such as the systems 100 and 200. A gesture may be recognized by the gesture recognition device 302 for control of a conveyance device (e.g., an elevator).

A gesture recognition device 302 may include one or more sensors 202. Gesture recognition device 302 may also include system 100, that executes a process to recognize gestures. System 100 may be located remotely from sensors 202, and may be part of a larger control system, such as conveyance device control system.

Gesture recognition device 302 may be configured to detect gestures made by one or more passengers of the conveyance device. For example, a "thumbs-up" gesture 304 may be used to replace or enhance the operation of an 'up' button 306 that may commonly be found in the hallway outside of an elevator or elevator car. Similarly, a "thumbs-down" gesture 308 may be used to replace or enhance the operation of a 'down' button 310. The gesture recognition device 302 may detect a gesture based on a depth stream or based on a combination of a depth stream and a video stream.

While the environment 300 is shown in connection with gestures for selecting a direction of travel, other types of commands or controls may be provided. For example, a passenger may hold up a single finger to indicate that she wants to go one floor up from the floor on which she is currently located. Conversely, if the passenger holds two fingers downward that may signify that the passenger wants to go down two floors from the floor on which she is currently located. Of course, other gestures may be used to provide floor numbers in absolute terms (e.g., go to floor #4).

An analysis of passenger gestures may be based on one or more techniques, such as dictionary learning, support vector machines, Bayesian classifiers, etc. The techniques may apply to depth information or a combination of depth information and video information, including color information.

Figure 4:
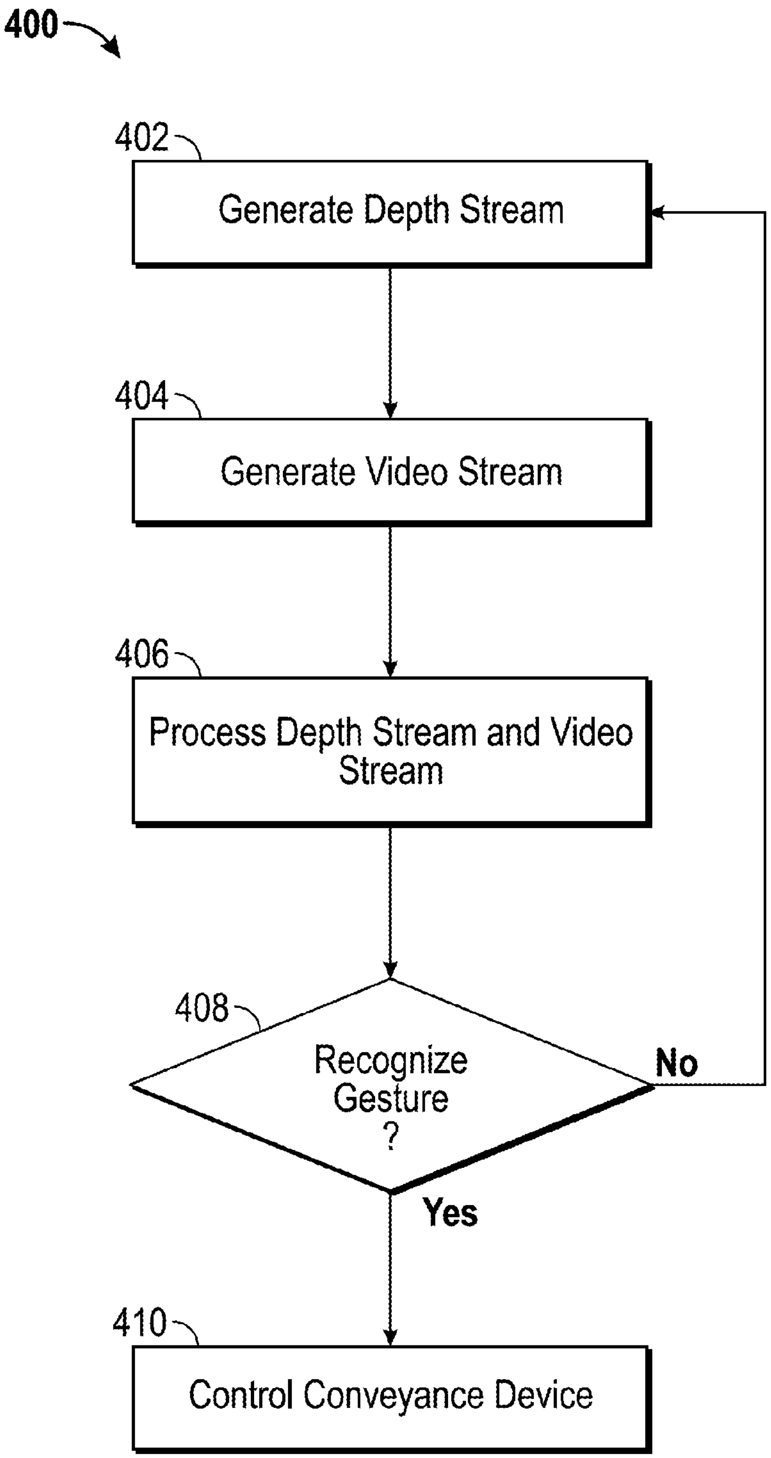
FIG. 4 illustrates a flow chart of an exemplary method.

Turning now to FIG. 4, a method 400 is shown. The method 400 may be executed in connection with one or more systems, components, or devices, such as those described herein (e.g., the system 100, the system 200, the gesture recognition device 302, etc.). The method 400 may be used to detect a gesture for purposes of controlling a conveyance device.

In block 402, a depth stream is generated by receiver 206 and in block 404 a video stream is generated from imager 208. In block 406, the depth stream and the video stream may be processed, for example, by system 100. Block 406 includes processing the depth stream and video stream to derive depth information and video information. The depth stream and the video stream may be aligned and then processed, or the depth stream and the video stream may be independently processed. The processing of block 406 may include a comparison between the depth information and the video information with a database or library of gestures.

In block 408, a determination may be made whether the processing of block 406 indicates that a gesture has been recognized. If so, flow may proceed to block 410. Otherwise, if a gesture is not recognized, flow may proceed to block 402.

In block 410, the conveyance device may be controlled in accordance with the gesture recognized in block 408.

The method 400 is illustrative. In some embodiments, one or more blocks or operations (or a portion thereof) may be optional. In some embodiments, the blocks may execute in an order or sequence different from what is shown in FIG. 4. In some embodiments, additional blocks not shown may be included. For example, in some embodiments, the recognition of the gesture in block 408 may include recognizing a series or sequence of gestures before flow proceeds to block 410. In some embodiments, a passenger providing a gesture may receive feedback from the conveyance device as an indication or confirmation that one or more gestures are recognized. Such feedback may be used to distinguish between intended gestures relative to inadvertent gestures.

In some instances, current technologies for 3D or depth sensing may be inadequate for sensing gestures in connection with the control of an elevator. Sensing requirements for elevator control may include the need to accurately sense gestures over a wide field of view and over a sufficient range to encompass, e.g., an entire lobby. For example, sensors for elevator control may need to detect gestures from 0.1 meters (m) to 10 m and at least a 60° field of view, with sufficient accuracy to be able to classify small gestures (e.g., greater than 100 pixels spatial resolution corresponding to a person's hand with 1 cm depth measurement accuracy).

Figure 5:
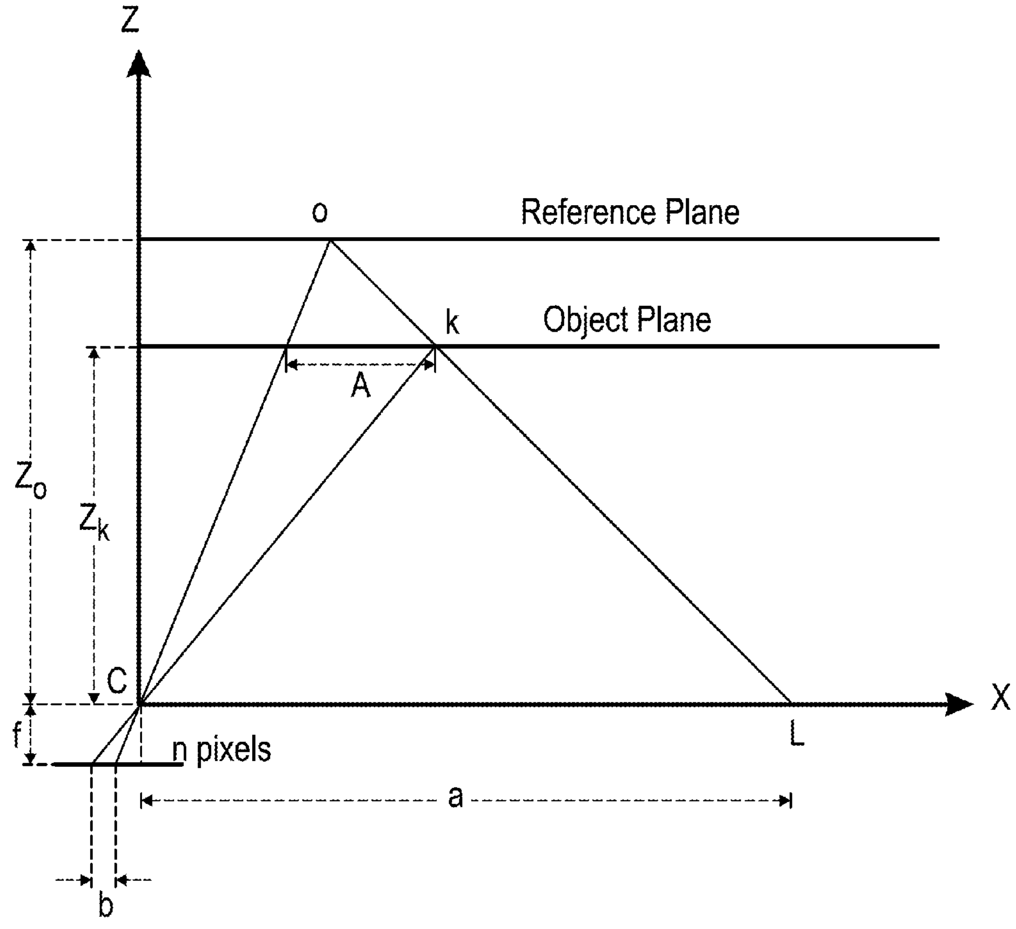
FIG. 5 illustrates an exemplary disparity diagram for a 3D depth sensor.

Depth sensing may be performed using one or more technical approaches, such as triangularization (e.g., stereo, structured light) and interferometry (e.g., scanning LIDAR, flash LIDAR, time-of-flight camera). These sensors (and stereo cameras) may depend on disparity as shown in FIG. 5. FIG. 5 uses substantially the same terminology and a similar analysis to Kourosh Khoshelham and Sander Oude Elberink, Accuracy and Resolution of Kinect Depth Data for Indoor Mapping Applications. Sensors 2012, 12, 1437-1454. A structured light projector 'L' may be at a distance (or aperture) 'a' from a camera 'C'. An object plane, at distance '$z_k$', may be at a different depth than a reference plane at a distance '$z_o$'. A beam of the projected light may intersect the object plane at a position 'k' and the reference plane at a position 'o'. Positions 'o' and 'k', separated by a distance 'A' in the object plane, may be imaged or projected onto an n-pixel sensor with a focal length 'f' and may be separated by a distance 'b' in the image plane.

In accordance with the geometry associated with FIG. 5 described above, and by similar triangles, equations #1 and #2 may be constructed as:

$$\frac{A}{a} = \frac{z_o - z_k}{z_o}, \qquad \text{equation \#1}$$

$$\frac{b}{f} = \frac{A}{z_k}. \qquad \text{equation \#2}$$

Substituting equation #1 into equation #2 will yield equation #3 as:

$$b = \frac{fa(z_o - z_k)}{z_o z_k}. \qquad \text{equation \#3}$$

Taking the derivative of equation #3 will yield equation #4 as:

$$\frac{db}{da} = \frac{f(z_o - z_k)}{z_o z_k}. \qquad \text{equation \#4}$$

Equation #4 illustrates that the change in the size of the projected image, 'b', may be linearly related to the aperture 'a' for constant f, $z_0$, and $z_k$.

The projected image may be indistinct on the image plane if it subtends less than one pixel, as provided in equation #5:

$$b \leq \frac{1}{n} \Leftrightarrow (z_o - z_k) \leq \frac{z_o z_k}{nfa}. \qquad \text{equation \#5}$$

Equation #5 shows that the minimum detectable distance difference (taken in this example to be one pixel) may be related to the aperture 'a' and the number of pixels 'n'.

Current sensors may have a range resolution of approximately 1 centimeter (cm) at a range of 3 m. The cross-range and range resolutions may decrease quadratically with range. Therefore, at 10 m, current sensors might have a range resolution of greater than 11 cm, which may be ineffective in distinguishing anything but the largest of gestures.

Current sensors at 3 m and with 649 pixels across a 57° field of view, may have approximately 4.6 mm/pixel spatial resolution horizontally, and 4.7 mm/pixel vertically. For a small person's hand (approximately 100 millimeters (mm) by 150 mm), current sensors may have approximately 22×32 pixels on target. However, at 10 m, current sensors may have approximately 15 mm/pixel or 6.5×9.6 pixels on target. Such a low amount of pixels on target may be insufficient for accurate gesture classification.

Current sensors cannot be modified to achieve the requirements by simply increasing the aperture 'a' because this would result in a non-overlapping of the projected pattern and infrared camera field of view close to the sensor. The non-overlapping would result in an inability to detect gestures when close to the sensor. As it is, current sensors cannot detect depth at a distance of less than 0.4 m.

Current sensors cannot be modified to achieve the requirements by simply increasing the focal length 'f' since a longer focal length may result in a shallower depth of field. A shallower depth of field may result in a loss of sharp focus and a resulting inability to detect and classify gestures.

Current sensors or commercially available sensors may be modified relative to an off-the-shelf version by increasing the number of pixels 'n' (see equation 5 above). This modification is feasible, given a low sensor resolution and the availability of higher resolution imaging chips.

Another approach is to arrange an array of triangulation sensors, each of which is individually insufficient to meet the desired spatial resolution while covering a particular field of view. Within the array, each sensor may cover a different field of view such that, collectively, the array covers the particular field of view with adequate resolution.

In some embodiments, elevator control gesture recognition may be based on a static 2D or 3D signature from a 2D or 3D sensing device, or a dynamic 2D/3D signature manifested over a period of time. The fusion of 2D and 3D information may be useful as a combined signature. In long-range imaging, a 3D sensor alone might not have the desired resolution for recognition, and in this case 2D information extracted from images may be complementary and useful for gesture recognition. In short-range and mid-range imaging, both 2D (appearance) and 3D (depth) information may be helpful in segmentation and detection of a gesture, and in recognition of the gestures based on combined 2D and 3D features.

In some embodiments, behaviors of passengers of an elevator may be monitored, potentially without the passengers even knowing that such monitoring is taking place. This may be particularly useful for security applications such as detecting vandalism or violence. For example, passenger behavior or states, such as presence, direction of motion, speed of motion, etc., may be monitored. The monitoring may be performed using one or more sensors, such as a 2D camera/receiver, a passive IR device, and a 3D sensor.

In some embodiments, gestures may be monitored or detected at substantially the same time as passenger behaviors/states. Thus, any processing for gesture recognition/detection and passenger behavior/state recognition/detection may occur in parallel. Alternatively, gestures may be monitored or detected independent of, or at a time that is different from, the monitoring or detection of the passenger behaviors/states.

In terms of the algorithms that may be executed or performed, gesture recognition may be substantially similar to passenger behavior/state recognition, at least in the sense that gesture recognition and behavior/state recognition may rely on a detection of an object or thing. However, gesture recognition may require a larger number of data points or samples and may need to employ a more refined model, database, or library relative to behavior/state recognition.

While some of the examples described herein related to elevators, aspects of this disclosure may be applied in connection with other types of conveyance devices, such as a dumbwaiter, an escalator, a moving sidewalk, a wheelchair lift, etc.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Embodiments may be implemented using one or more technologies. In some embodiments, an apparatus or system may include one or more processors, and memory storing instructions that, when executed by the one or more processors, cause the apparatus or system to perform one or more methodological acts as described herein. Various mechanical components known to those of skill in the art may be used in some embodiments.

Embodiments may be implemented as one or more apparatuses, systems, and/or methods. In some embodiments, instructions may be stored on one or more computer program products or computer-readable media, such as a transitory and/or non-transitory computer-readable medium. The instructions, when executed, may cause an entity (e.g., an apparatus or system) to perform one or more methodological acts as described herein.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional.

What is claimed is:

1. A method comprising:

generating a depth stream from a scene associated with a conveyance device;

generating a video stream from the scene;

processing, by a computing device, the depth stream to obtain depth information;

processing, by the computing device, the video stream to obtain video information;

recognizing a gesture based on the depth information and the video information; and controlling the conveyance device based on the gesture.

2. The method of claim 1, wherein the depth stream is based on at least one of: a structured-light base, time-of-flight, stereo, laser scanning, and light detection and ranging (LIDAR).

3. The method of claim 1, wherein the depth stream and the video stream are aligned and processed jointly.

4. The method of claim 1, wherein the depth stream and the video stream are processed independently.

5. The method of claim 1, where the gesture is recognized based on at least one of: dictionary learning, support vector machines, and Bayesian classifiers.

6. The method of claim 1, wherein the conveyance device comprises an elevator.

7. The method of claim 1, wherein the gesture comprises an indication of a direction of travel, and wherein the conveyance device is controlled to travel in the indicated direction.

8. An apparatus comprising:

at least one processor; and memory having instructions stored thereon that, when executed by the at least one processor, cause the apparatus to:

generate a depth stream from a scene associated with a conveyance device;

generate a video stream from the scene;

process, by a computing device, the depth stream to obtain depth information;

process, by the computing device, the video stream to obtain video information;

recognize a gesture based on the depth information and the video information; and control the conveyance device based on the gesture.

9. The apparatus of claim 8, wherein the depth stream is based on at least one of: a structured-light base, time-of-flight, stereo, laser scanning, and light detection and ranging (LIDAR).

10. The apparatus of claim 8, wherein the instructions, when executed by the least one processor, cause the apparatus to:

align and process jointly the depth stream and the video stream.

11. The apparatus of claim 8, wherein the instructions, when executed by the least one processor, cause the apparatus to:

process independently the depth stream and the video stream.

12. The apparatus of claim 8, where the gesture is recognized based on at least one of: dictionary learning, support vector machines, and Bayesian classifiers.

13. The apparatus of claim 8, wherein the conveyance device comprises at least one of an elevator, a dumbwaiter, an escalator, a moving sidewalk, and a wheelchair lift.

14. The apparatus of claim 8, wherein the conveyance device comprises an elevator, and wherein the gesture comprises an indication of at least one of a direction of travel and a floor number.

15. A system comprising:

an emitter configured to emit a pattern of infrared (IR) light onto a scene comprising a plurality of objects;

an imager to generate a video stream;

a receiver configured to generate a depth stream in response to the emitted pattern; and a processing device configured to:

process the depth stream to obtain depth information, process the video stream to obtain video information;

recognize a gesture made by at least one of the objects based on the depth information and the video information, and control a conveyance device based on the gesture.

16. The system of claim 15, wherein the receiver comprises a commercially available sensor with an increased number of pixels relative to an off-the-shelf version of the sensor.

17. The system of claim 15, wherein the receiver comprises a plurality of triangulation sensors, wherein each of the sensors covers a portion of a particular field of view.

18. The system of claim 15, wherein the processing device is configured to estimate at least one passenger state based on the depth information.

19. The system of claim 18, wherein the at least one passenger state comprises at least one of: presence, direction of motion, and speed of motion.

20. The method of claim 1, wherein the video information comprises color information.

* * * * *